US012598607B2

(12) United States Patent
Xu

(10) Patent No.: US 12,598,607 B2
(45) Date of Patent: Apr. 7, 2026

(54) WIRELESS COMMUNICATION METHOD AND DEVICE

(71) Applicant: GUANGDONG OPPO MOBILE TELECOMMUNICATIONS CORP., LTD., Dongguan (CN)

(72) Inventor: Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 438 days.

(21) Appl. No.: 18/090,196

(22) Filed: Dec. 28, 2022

(65) Prior Publication Data

US 2023/0137165 A1 May 4, 2023

Related U.S. Application Data

(63) Continuation of application No. PCT/CN2021/098194, filed on Jun. 3, 2021.

(30) Foreign Application Priority Data

Aug. 25, 2020 (CN) .......................... 202010869240.0

(51) Int. Cl.
*H04W 72/1268* (2023.01)
*H04W 72/563* (2023.01)

(52) U.S. Cl.
CPC ..... *H04W 72/1268* (2013.01); *H04W 72/563* (2023.01)

(58) Field of Classification Search
CPC ........... H04W 72/1268; H04W 72/563; H04W 72/12; H04W 72/1263; H04W 72/044; H04W 72/56
See application file for complete search history.

(56) References Cited

U.S. PATENT DOCUMENTS

2017/0332386 A1* 11/2017 Li .......................... H04W 72/56
2019/0223205 A1 7/2019 Papasakellariou et al.
(Continued)

FOREIGN PATENT DOCUMENTS

AU 2018407157 A 6/2020
CN 108292969 A 7/2018
(Continued)

OTHER PUBLICATIONS

Communication pursuant to Article 94(3) EPC issued by the EPO for Application No. EP21859757.3 mailed on Jul. 5, 2024.
(Continued)

*Primary Examiner* — Ankur Jain
(74) *Attorney, Agent, or Firm* — Sheppard, Mullin, Richter & Hampton LLP

(57) ABSTRACT

Provided are a wireless communication method and device. The method includes: determining, based on a first channel, whether to cancel transmission of a second channel. The first channel is determined based on at least one initial channel, and each initial channel of the at least one initial channel has a priority higher than a priority of the second channel. Whether to cancel the transmission of the second channel is determined based on the first channel, and the first channel is determined based on at least one initial channel. That is, the first channel that is used to determine whether to trigger to cancel transmission of the second channel is determined based on the at least one initial channel, which can ensure that the terminal device and the network device have consistent understandings of the first channel that is used to trigger whether to cancel transmission of the second channel.

20 Claims, 3 Drawing Sheets

200

Determining, based on a first channel, whether to cancel transmission of a second channel, the first channel being determined based on at least one initial channel, and each of the at least one initial channel having a priority higher than a priority of the second channel

S210

(56) References Cited

U.S. PATENT DOCUMENTS

| | | | | |
|---|---|---|---|---|
| 2020/0053761 A1* | 2/2020 | Hosseini | ............... | H04W 72/56 |
| 2020/0322971 A1* | 10/2020 | Jung | .................... | H04L 5/0064 |
| 2022/0295334 A1* | 9/2022 | Sun | .................. | H04W 72/0453 |

FOREIGN PATENT DOCUMENTS

| | | | | |
|---|---|---|---|---|
| CN | 109644408 A | 4/2019 | | |
| CN | 110474747 A | 11/2019 | | |
| CN | 110535583 A | 12/2019 | | |
| CN | 110536463 A | 12/2019 | | |
| CN | 110972303 A | 4/2020 | | |
| CN | 110999510 A | 4/2020 | | |
| CN | 111066359 A | 4/2020 | | |
| CN | 111278144 A | 6/2020 | | |
| CN | 111510271 A | 8/2020 | | |
| CN | 111526539 A | 8/2020 | | |
| EP | 3499773 A1 * | 6/2019 | ............... | H04L 5/00 |
| WO | 2019029454 A1 | 2/2019 | | |
| WO | 2018407157 A1 | 8/2019 | | |
| WO | 2019154357 A | 8/2019 | | |
| WO | 2019162929 A | 8/2019 | | |
| WO | 2019191967 A1 | 10/2019 | | |
| WO | WO-2020024754 A1 * | 2/2020 | ........ | H04W 72/0413 |
| WO | 2020067985 A | 4/2020 | | |
| WO | 2020168223 A | 8/2020 | | |

OTHER PUBLICATIONS

First Office Action issued by the Chinese Patent Office for Application No. 202310387186.X mailed on Aug. 27, 2024.

Vivo, "UCI enhancements for URLLC", 3GPP TSG RAN WG1 #99, R1-1912031, Nov. 18-22, 2019.

Wang, "LS on Intra-UE Prioritization for data with different priorities", 3GPP TSG RAN WG2#111-e, R2-2006509, Online meeting, Aug. 17-28, 2020.

Communication pursuant to Article 94(3) EPC issued by the EPO for Application No. EP21859757.3 mailed on Dec. 10, 2024.

Office Action issued by the China Patent Office for Application No. 202310387186.X mailed on Feb. 8, 2025.

EP21859757.3 Examiners call and proposed amendment dated Feb. 20, 2025.

Extended European Search Report dated Oct. 10, 2023 received in European Patent Application No. EP21859757.3.

International Search Report and Written Opinion dated Sep. 9, 2021 in International Application No. PCT/CN2021/098194. English translation attached.

Office Action issued by the European Patent Office for Application No. 21859757.3 mailed on Nov. 21, 2025.

* cited by examiner

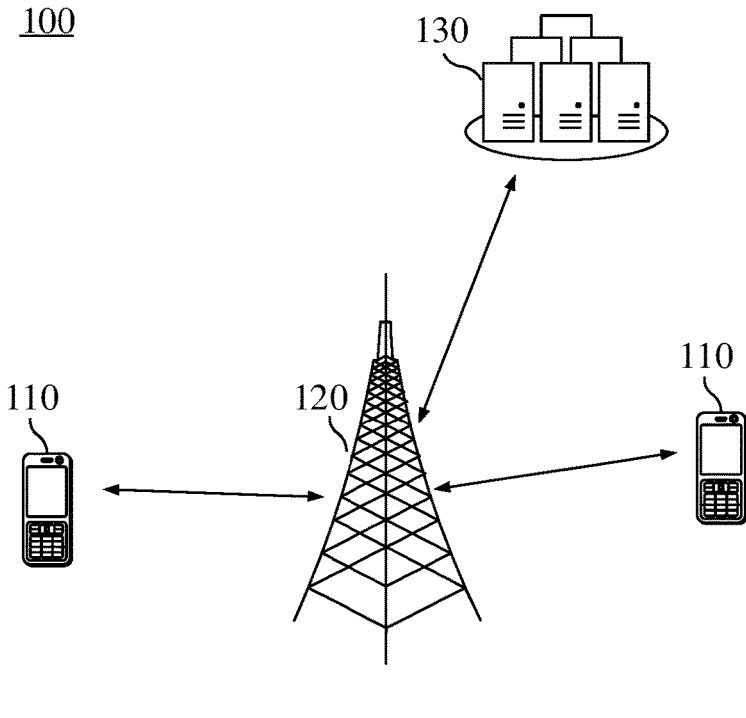
<u>100</u>
FIG. 1
<u>200</u>
Determining, based on a first channel, whether to cancel transmission of a second channel, the first channel being determined based on at least one initial channel, and each of the at least one initial channel having a priority higher than a priority of the second channel   S210
FIG. 2
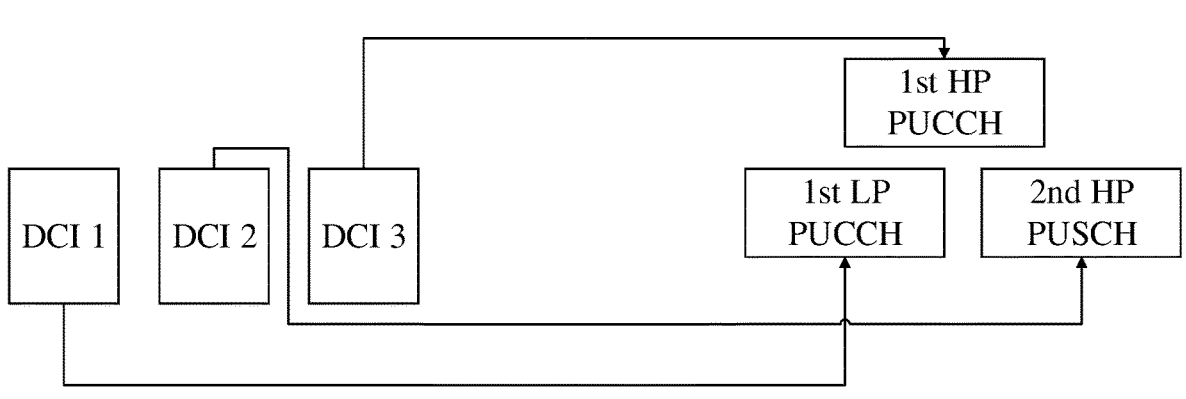
FIG. 3

WIRELESS COMMUNICATION METHOD AND DEVICE

CROSS-REFERENCE TO RELATED APPLICATIONS

This application is a continuation of International Application No. PCT/CN2021/098194, filed on Jun. 3, 2021, which claims priority to and benefits of Chinese Patent Application No. 202010869240.0, filed with China National Intellectual Property Administration on Aug. 25, 2020, the entire contents of both of which are incorporated herein by reference.

FIELD

The present disclosure relates to the filed of communication technology, and more particularly, to a wireless communication method and device.

BACKGROUND

In a communication system, a terminal device may transmit an uplink channel to a network device. For example, the network device may schedule the terminal device to transmit the uplink channel via scheduling information. Therefore, it is inevitable that transmissions of multiple uplink channels overlap in a time domain.

However, when multiple channels overlap in the time domain, how to ensure normal transmission of data is a technical problem that needs to be solved urgently in the art.

SUMMARY

The present disclosure provides a wireless communication method and device, capable of ensuring normal transmission of data when multiple channels overlap in the time domain.

In a first aspect, a wireless communication method is provided. The method includes: determining, based on a first channel, whether to cancel transmission of a second channel. The first channel is determined based on at least one initial channel. Each initial channel of the at least one initial channel has a priority higher than a priority of the second channel.

In a second aspect, a terminal device is provided. The terminal device is configured to perform the method according to the above first aspect or any implementation thereof. In particular, the terminal device includes one or more functional modules configured to perform the method according to the above first aspect or any implementation thereof.

In a third aspect, a network device is provided. The network device is configured to perform the method according to the above first aspect or any implementation thereof. In particular, the terminal device includes one or more functional modules configured to perform the method according to the above first aspect or any implementation thereof.

In a fourth aspect, a terminal device is provided. The terminal device includes a processor and a memory. The memory has a computer program stored thereon, and the processor is configured to invoke and execute the computer program stored in the memory to perform the method according to the above first aspect or any implementation thereof.

In a fifth aspect, a network device is provided. The network device includes a processor and a memory. The memory has a computer program stored thereon, and the processor is configured to invoke and execute the computer program stored in the memory to perform the method according to the above first aspect or any implementation thereof.

In a sixth aspect, a chip is provided. The chip is configured to configured to implement the method according to the above first aspect or any implementation thereof. In particular, the chip includes a processor configured to invoke and execute a computer program from a memory, to cause a device provided with the chip to perform the method according to the above first aspect or any implementation thereof.

In an eighth aspect, a computer-readable storage medium is provided. The computer-readable storage medium has a computer program stored thereon. The computer program causes a computer to perform the method according to the above first aspect or any implementation thereof.

In a ninth aspect, a computer program product is provided. The computer program product includes computer program instructions that cause a computer to perform the method according to the above first aspect or any implementation thereof.

In a tenth aspect, a computer program is provided. The computer program, when executed by a computer, causes the computer to perform the method according to the first aspect or any implementation thereof.

With the above technical solutions, whether to cancel the transmission of the second channel is determined based on the first channel, and the first channel is determined based on at least one initial channel. That is, the first channel that is used to determine whether to trigger canceling transmission of a second channel is determined based on the at least one initial channel, which can ensure that the terminal device and the network device have consistent understandings of the first channel determining whether to trigger canceling transmission of the second channel, and further, can ensure normal channel transmission.

BRIEF DESCRIPTION OF THE DRAWINGS

FIG. 1 is an example of an application scenario according to an embodiment of the present disclosure.

FIG. 2 is a schematic flowchart of a wireless communication method according to an embodiment of the present disclosure.

FIG. 3 and FIG. 4 are schematic block diagrams of channels having priorities according to embodiments of the present disclosure.

DETAILED DESCRIPTION

Figure 4:
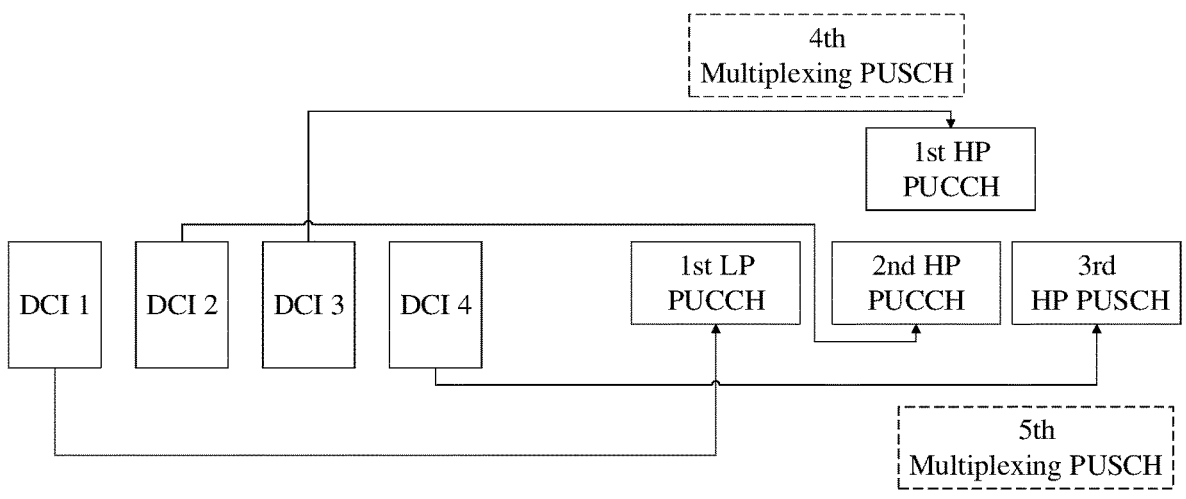

The technical solutions in the embodiments of the present disclosure will be described below with reference to the figures in the embodiments of the present disclosure. Obviously, the described embodiments are only some embodiments, rather than all embodiments of the present disclosure.

All other embodiments obtained by those skilled in the art based on the embodiments in the present disclosure without inventive efforts are to be encompassed by the scope of the present disclosure.

FIG. 1 is a schematic diagram of an application scenario according to an embodiment of the present disclosure.

As shown in FIG. 1, a communication system 100 may include a terminal device 110 and a network device 120. The network device 120 may communicate with the terminal device 110 through an air interface. Multi-service transmission is supported between the terminal device 110 and the network device 120.

It should be understood that the communication system 100 is described as an example in the embodiments of the present disclosure, but the embodiments of the present disclosure are not limited to the example. That is to say, the technical solutions of the embodiments of the present disclosure may be applied to various communication systems, such as: a Long Term Evolution (LTE) system, an LTE Time Division Duplex (TDD), a Universal Mobile Telecommunication System (UMTS), a 5G communication system (also referred to as New Radio (NR) communication system), or a future communication system, etc.

In the communication system 100 shown in FIG. 1, the network device 120 may be an access network device that communicates with the terminal device 110. The access network device may provide communication coverage for a particular geographic area, and may communicate with the terminal device 110 (such as UE) located within the coverage.

The network device 120 may be a Evolutional Node B (eNB or eNodeB) in an LTE system, or a Next Generation Radio Access Network (NG RAN) device, or a base station (e.g., gNB) in an NR system, or a wireless controller in a Cloud Radio Access Network (CRAN). Alternatively, the network device 120 may be a relay station, an access point, a vehicle-mounted device, a wearable device, a hub, a switch, a bridge, a router, or a network device in a future evolved Public Land Mobile Network (PLMN), etc.

The terminal device 110 may be any terminal device, which includes, but is not limited to, a terminal device that adopts a wired or wireless connection with the network device 120 or other terminal devices.

For example, the terminal device 110 may refer to an access terminal, a User Equipment (UE), a user unit, a user station, a mobile station, a remote station, a remote terminal, a mobile device, a user terminal, a terminal, a wireless communication device, a user agent or a user device. The access terminal may be a cellular phone, a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, a vehicle-mounted device, a wearable device, a terminal device in 5G network or a terminal device in future evolved network, etc.

The terminal device 110 may be used for Device to Device (D2D) communication.

The wireless communication system 100 may further include a core network device 130 that communicates with the base station. The core network device 130 may be a 5G core network (5G Core, 5GC) device, for example, an Access and Mobility Management Function (AMF), or for another example, an Authentication Server Function (AUSF), or for another example, a User Plane Function (UPF), or for another example, a Session Management Function (SMF). Optionally, the core network device 130 may be an Evolved Packet Core (EPC) device in an LTE network, for example, a Session Management Function+Core Packet Gateway (SMF+PGW-C) device. It should be understood that the SMF+PGW-C can implement both the functions that the SMF and the PGW-C can implement. In the network evolution process, the above-mentioned core network device may be called by other names, or form a new network entity by dividing the functions of the core network, and the embodiments of the present disclosure are not limited to any of these examples.

A connection among various functional units in the communication system 100 may be established through a next generation network (NG) interface to implement communication.

For example, the terminal device establishes an air interface connection with the access network device through an NR interface to transmit user plane data and control plane signaling; the terminal device may establish a control plane signaling connection with the AMF through an NG interface 1 (N1 for short); the access network device, such as a next generation wireless access base station (e.g., gNB), may establish a user plane data connection with the UPF through an NG interface 3 (N3 for short); the access network device may establish a control plane signaling connection with the AMF through an NG interface 2 (N2 for short); the UPF may establish a control plane signaling connection with the SMF through an NG interface 4 (N4 for short); the UPF may exchange user plane data with the data network through an NG interface 6 (N6 for short); the AMF may establish a control plane signaling connection with the SMF through an NG interface 11 (N11 for short); and the SMF may establish a control plane signaling connection with the PCF through an NG interface 7 (N7 for short).

FIG. 1 exemplarily shows one base station, one core network device and two terminal devices. Optionally, the wireless communication system 100 may include multiple base station devices, and the coverage of each base station device may include other numbers of terminal devices. The embodiment of the present disclosure is not limited to any of these examples.

It can be appreciated that, in the embodiments of the present disclosure, a device having a communication function in a network/system may be referred to as a communication device. Taking the communication system 100 shown in FIG. 1 as an example, the communication devices may include the network device 120 and the terminal device 110 with communication functions. The network device 120 and the terminal device 110 may be the specific devices described above, and details thereof will be omitted here. The communication devices may further include other devices in the communication system 100, e.g., other network entities such as a network controller, a mobility management entity, etc., and the embodiments of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

FIG. 2 illustrates a schematic flowchart of a wireless communication method 200 according to an embodiment of the present disclosure. The method 200 may be executed by a terminal device, for example, the terminal device shown in FIG. 1, and by a network device, for another example, the access network device shown in FIG. 1.

As shown in FIG. 2, the method 200 may include a step 210.

At S210, it is determined, based on a first channel, whether to cancel transmission of a second channel.

The first channel is determined based on at least one initial channel, and each initial channel of the at least one initial channel has a priority higher than a priority of the second channel.

For example, the terminal device or the network device may determine the first channel based on the at least one initial channel, and then determine whether to cancel the transmission of the second channel based on an overlapping situation of the first channel and the second channel. For example, if the first channel and the second channel fully or partially overlap, it is determined to cancel the transmission of the second channel. If the first channel and the second channel do not overlap, the second channel is transmitted.

Whether to cancel the transmission of the second channel is determined based on the first channel, and the first channel is determined based on at least one initial channel. That is, the first channel that is used to determine whether to trigger canceling transmission of the second channel is determined based on the at least one initial channel, which can ensure that the terminal device and the network device have consistent understandings of the first channel determining whether to trigger canceling transmission of the second channel, and further, can ensure normal channel transmission.

In some embodiments of the present disclosure, the first channel and the second channel fully or partially overlap.

For example, the at least one initial channel and the second channel fully or partially overlap in a time domain. For example, each initial channel of the at least one initial channel and the second channel fully or partially overlap in the time domain. For another example, some initial channels of the at least one initial channel and the second channel fully or partially overlap in the time domain.

In some embodiments of the present disclosure, first scheduling information for triggering the first channel is not earlier than scheduling information corresponding to any one of the at least one initial channel other than an initial channel corresponding to the first scheduling information.

For example, a time domain position of the first scheduling information for triggering the first channel is not earlier than a time domain position of scheduling information corresponding to any one of the at least one initial channel other than an initial channel corresponding to the first scheduling information.

For example, the time domain position of the scheduling information may be a time domain position of downlink scheduling information, or may be a time domain position determined based on an uplink channel. For example, the time domain position determined based on the uplink channel may be a time domain position of a semi-static or semi-persistent configured uplink channel.

In some embodiments of the present disclosure, the first channel is directly scheduled by first scheduling information for triggering the first channel.

In some embodiments of the present disclosure, the at least one initial channel is transmitted by multiplexing.

In some embodiments of the present disclosure, the first channel is determined after multiplexing or overriding of the at least one initial channel.

The first channel is designed to be determined after multiplexing or overriding of the at least one initial channel, which is equivalent to that the channel determined after the multiplexing or overriding of the at least one initial channel may be used as the first channel determining whether to trigger canceling the transmission of the second channel. In this way, it not only can ensure that the terminal device and the network device have the same understanding of the first channel determining whether to trigger canceling the transmission of the second channel so as to ensure the normal channel transmission, but also can preferentially ensure the normal transmission of the at least one initial channel, and accordingly, can avoid unnecessary cancellation or information discarding, to improve transmission efficiency as much as possible.

In some embodiments of the present disclosure, S210 may include:

determining to cancel the transmission of the second channel based on the first channel.

In some embodiments of the present disclosure, the method 200 may further include:

maintaining cancellation of the transmission of the second channel in a case where a third channel and the second channel do not overlap.

In some embodiments of the present disclosure, scheduling information for triggering the third channel is not earlier than first scheduling information for triggering the first channel.

In some embodiments of the present disclosure, S210 may include:

determining to cancel the transmission of the second channel in a case that the first channel and the second channel overlap; and/or
   transmitting the second channel in a case that the first channel and the second channel do not overlap.

In some embodiments of the present disclosure, the at least one initial channel includes a channel indicated by scheduling information and/or a channel determined by the scheduling information.

For example, the at least one initial channel may be directly indicated by latest scheduling information and previous scheduling information, or may be directly determined by the latest scheduling information and indirectly determined by the previous scheduling information. Optionally, the indirect determination may refer to: determining after multiplexing or overriding of an uplink channel directly determined based on scheduling information.

In some embodiments of the present disclosure, the channel determined by the scheduling information includes: a channel determined after multiplexing or overriding of a channel determined directly based on the scheduling information.

In some embodiments of the present disclosure, the first channel and the second channel are uplink channels.

In some embodiments of the present disclosure, the uplink channel includes a Physical Uplink Control CHannel (PUCCH) and/or a Physical Uplink Shared CHannel (PUSCH).

In some embodiments of the present disclosure, a time domain position of the first scheduling information for triggering the first channel is a time domain position of the first scheduling information or a time domain position determined based on the first channel.

In some embodiments of the present disclosure, the time domain position of the first scheduling information is the time domain position determined based on the first channel, and the first channel is a semi-static or semi-persistently configured uplink channel.

For example, a symbol preceding a symbol where the first channel is located may be determined as the time domain position of the first scheduling information.

The technical solutions of the present disclosure will be described below with reference to Embodiments 1 to 3.

Embodiment 1

FIG. 3 is a schematic block diagram of channels having priorities according to an embodiment of the present disclosure. Embodiment 1 will be described below with reference to FIG. 3.

As shown in FIG. 3, DCI 1 is used to schedule a first low-priority channel (1st LP PUCCH), DCI 2 is used to schedule a second high-priority channel (2nd HP PUSCH), and DCI 3 is used to schedule a first high-priority channel (1st HP PUCCH).

Optionally, the first high-priority uplink channel overlaps with the first low-priority uplink channel and the second high-priority uplink channel in the time domain, and a time domain position of scheduling information corresponding to the first high-priority uplink channel is not earlier than a time domain position of scheduling information corresponding to the second high-priority uplink channel.

Optionally, it is determined to cancel transmission of the first low-priority uplink channel based on the first high-priority uplink channel.

Optionally, the first high-priority uplink channel and the second high-priority uplink channel are transmitted by multiplexing.

Optionally, the uplink channel may be PUCCH/PUSCH.

Optionally, the time domain position of the scheduling information may be a time domain location of downlink scheduling information, or may be a time domain position determined based on the uplink channel.

Optionally, the time domain position determined based on the uplink channel is used for a semi-static or semi-persistent configured uplink channel.

Optionally, the uplink channel may be directly indicated by scheduling information, or may be determined by multiplexing of multiple uplink channels with the same priority.

Embodiment 2

FIG. 4 is another schematic block diagram of channels having priorities according to an embodiment of the present disclosure. Embodiment 2 will be described below with reference to FIG. 4.

As shown in FIG. 4, DCI 1 is used to schedule a first low-priority channel (1st LP PUCCH), DCI 2 is used to schedule a second high-priority channel (2nd HP PUCCH), and DCI 3 is used to schedule a first high-priority channel (1st HP PUCCH), and DCI 4 is used to schedule a third high-priority channel (3rd HP PUSCH).

Optionally, the first high-priority uplink channel overlaps with the first low-priority uplink channel and the second high-priority uplink channel in a time domain, and downlink scheduling information corresponding to the first-high priority uplink channel is not earlier than downlink scheduling information corresponding to the second high-priority uplink channel.

Optionally, whether to cancel transmission of the first low-priority uplink channel may be determined based on the third high-priority uplink channel. The third high-priority uplink channel is determined by multiplexing the first high-priority uplink channel and the second high-priority channel.

For example, if the third high-priority uplink channel and the first low-priority channel overlap in the time domain, the transmission of the first low-priority uplink channel is cancelled. If the third high-priority uplink channel and the first low-priority channel do not overlap in the time domain, the first low-priority uplink channel may be transmitted.

Optionally, the uplink channel can be PUCCH/PUSCH.

Optionally, a time domain position of the scheduling information may be a time domain position of downlink scheduling information, or may be a time domain position determined based on the uplink channel.

Optionally, the time domain position determined based on the uplink channel is used for a semi-static or semi-persistent configured uplink channel.

Optionally, the uplink channel may be directly indicated by scheduling information, or may be determined by multiplexing of multiple uplink channels with the same priority.

Embodiment 3

Optionally, if the first high-priority uplink channel and the first low-priority uplink channel overlap in the time domain, transmission of the first low-priority uplink channel is cancelled.

Optionally, the second high-priority uplink channel and the first low-priority uplink channel do not overlap in the time domain, and the transmission of the first low-priority uplink channel is still cancelled.

Optionally, the time domain position of the scheduling information corresponding to the second high-priority uplink channel is not earlier than the time domain position of the scheduling information corresponding to the first high-priority uplink channel.

Optionally, information may be transmitted or received on the second high-priority uplink channel.

The preferred embodiments of the present disclosure have been described in detail above with reference to the accompanying drawings. However, the present disclosure is not limited to the specific details of the above embodiments. Within the scope of the technical concept of the present disclosure, various simple variants can be made to the technical solutions of the present disclosure. These simple variants all belong to the scope of the present disclosure. For example, the specific technical features described in the above specific embodiments can be combined in any suitable manner, provided that they do not conflict. In order to avoid unnecessary repetition, the present disclosure does not describe these possible combinations. In another example, the embodiments of the present disclosure can also be combined arbitrarily without departing from the concept of the present disclosure, these combinations should also be regarded as a part of the content disclosed in the present disclosure.

It should also be understood that, in the method embodiments of the present disclosure, the sequence numbers of the above processes do not mean the order of execution, and the order of execution of each process should be determined by its functions and internal logics, and the implementation of the embodiments of the present disclosure is not limited to any specific order of execution. In addition, in the embodiments of the present disclosure, the terms "downlink" and "uplink" are used to indicate the transmission direction of signals or data, where "downlink" is used to indicate that the transmission direction of signals or data is a first direction from a station to a user equipment of a cell, and "uplink" is used to indicate that the transmission direction of signals or data is a second direction from a user equipment of a cell to a station. For example, a "downlink signal" means that the transmission direction of the signal is the first direction. In addition, in the embodiment of the present disclosure, the term "and/or" only represents a relationship between correlated objects, including three relationships. In particular, "A and/or B" may mean A only, B only, or both A and B. In addition, the symbol "I" as used herein represents an "or" relationship between the correlated objects preceding and succeeding the symbol.

The method embodiments of the present disclosure have been described in detail above with reference to FIGS. 1 to 4, and the apparatuses according to the present disclosure will be described below with reference to FIGS. 5 to 8.

Figure 5:
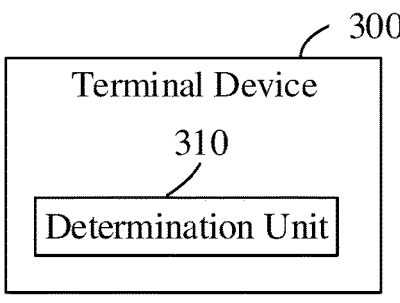
FIG. 5 is a schematic block diagram of a terminal device according to an embodiment of the present disclosure.

FIG. 5 is a schematic block diagram of a terminal device 300 according to an embodiment of the present disclosure.

As shown in FIG. 5, the terminal device 300 may include:

a determination unit 310 configured to determine whether to cancel transmission of a second channel based on a first channel.

The first channel is determined by at least one initial channel, and each initial channel of the at least one initial channel has a priority higher than a priority of the second channel.

In some embodiments of the present disclosure, the first channel and the second channel fully or partially overlap.

In some embodiments of the present disclosure, first scheduling information for triggering the first channel is not earlier than scheduling information corresponding to any one of the at least one initial channel other than an initial channel corresponding to the first scheduling information.

In some embodiments of the present disclosure, the first channel is directly scheduled by first scheduling information for triggering the first channel.

In some embodiments of the present disclosure, the at least one initial channel is transmitted by multiplexing.

In some embodiments of the present disclosure, the first channel is determined after multiplexing or overriding of the at least one initial channel.

In some embodiments of the present disclosure, the determination unit 310 is specifically configured to:

determine to cancel the transmission of the second channel based on the first channel.

In some embodiments of the present disclosure, the determination unit 310 is further configured to:

maintain cancellation of the transmission of the second channel in a case that a third channel and the second channel do not overlap.

In some embodiments of the present disclosure, scheduling information for triggering the third channel is not earlier than first scheduling information for triggering the first channel.

In some embodiments of the present disclosure, the determination unit 310 is specifically configured to:

determine to cancel the transmission of the second channel in a case that the first channel and the second channel overlap; and/or transmit the second channel in a case that the first channel and the second channel do not overlap.

In some embodiments of the present disclosure, the at least one initial channel includes a channel indicated by scheduling information and/or a channel determined by the scheduling information.

In some embodiments of the present disclosure, the channel determined by the scheduling information includes: a channel directly determined after multiplexing or overriding of a channel determined directly based on the scheduling information.

In some embodiments of the present disclosure, the first channel and the second channel are uplink channels.

In some embodiments of the present disclosure, the uplink channel includes a Physical Uplink Control CHannel (PUCCH) and/or a Physical Uplink Shared CHannel (PUSCH).

In some embodiments of the present disclosure, a time domain position of the first scheduling information for triggering the first channel is a time domain position of the first scheduling information or a time domain position determined based on the first channel.

In some embodiments of the present disclosure, the time domain position of the first scheduling information is the time domain position determined based on the first channel, and the first channel is a semi-static or semi-persistent configured uplink channel.

It can be appreciated that the apparatus embodiments and the method embodiments may correspond to each other, and for similar description, reference can be made to the method embodiments. Specifically, the terminal device 300 shown in FIG. 5 may correspond to the corresponding entity performing the method 200 according to the embodiments of the present disclosure, and the above and other operations and/or functions of the respective units in the terminal device 300 are provided for the purpose of implementing the corresponding process in each of the methods in FIG. 2. For brevity, the details will be omitted here.

Figure 6:
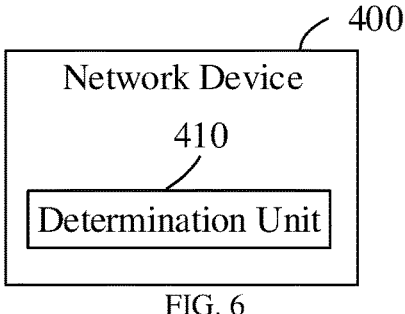
FIG. 6 is a schematic block diagram of a network device according to an embodiment of the present disclosure.

FIG. 6 is a schematic block diagram of a network device 400 according to an embodiment of the present disclosure.

As shown in FIG. 6, the network device 400 may include:

a determination unit 410 configured to determine whether to cancel transmission of a second channel based on a first channel.

The first channel is determined by at least one initial channel, and each initial channel of the at least one initial channel has a priority higher than a priority of the second channel.

In some embodiments of the present disclosure, the first channel and the second channel fully or partially overlap.

In some embodiments of the present disclosure, first scheduling information for triggering the first channel is not earlier than scheduling information corresponding to any one of the at least one initial channel other than an initial channel corresponding to the first scheduling information.

In some embodiments of the present disclosure, the first channel is directly scheduled by first scheduling information for triggering the first channel.

In some embodiments of the present disclosure, the at least one initial channel is transmitted by multiplexing.

In some embodiments of the present disclosure, the first channel is determined after multiplexing or overriding of the at least one initial channel.

In some embodiments of the present disclosure, the determination unit 410 is specifically configured to:

determine to cancel the transmission of the second channel based on the first channel.

In some embodiments of the present disclosure, the determination unit 410 is further configured to:

maintain cancellation of the transmission of the second channel in a case that a third channel and the second channel do not overlap.

In some embodiments of the present disclosure, scheduling information for triggering the third channel is not earlier than first scheduling information for triggering the first channel.

In some embodiments of the present disclosure, the determination unit 410 is specifically configured to:

determine to cancel the transmission of the second channel in a case that the first channel and the second channel overlap; and/or transmit the second channel in a case that the first channel and the second channel do not overlap.

In some embodiments of the present disclosure, the at least one initial channel includes a channel indicated by scheduling information and/or a channel determined by the scheduling information.

In some embodiments of the present disclosure, the channel determined by the scheduling information includes: a channel determined after multiplexing or overriding of a channel determined directly based on the scheduling information.

In some embodiments of the present disclosure, the first channel and the second channel are uplink channels.

In some embodiments of the present disclosure, the uplink channel includes a Physical Uplink Control CHannel (PUCCH) and/or a Physical Uplink Shared CHannel (PUSCH).

In some embodiments of the present disclosure, a time domain position of the first scheduling information for triggering the first channel is a time domain position of the first scheduling information or a time domain position determined based on the first channel.

In some embodiments of the present disclosure, the time domain position of the first scheduling information is the time domain position determined based on the first channel, and the first channel is a semi-static or semi-persistent configured uplink channel.

It can be appreciated that the apparatus embodiments and the method embodiments may correspond to each other, and for similar description, reference can be made to the method embodiments. Specifically, the terminal device 400 shown in FIG. 6 may correspond to the corresponding entity performing the method 200 according to the embodiments of the present disclosure, and the above and other operations and/or functions of the respective units in the terminal device 400 are provided for the purpose of implementing the corresponding process in each of the methods in FIG. 2. For brevity, the details will be omitted here.

The communication device according to the embodiment of the present disclosure has been described above from the perspective of functional modules with reference to the accompanying drawings. It should be understood that the functional modules can be implemented in the form of hardware, or by instructions in the form of software, or by a combination of hardware and software modules.

Specifically, the steps of the method embodiments of the present disclosure may be completed by hardware integrated logic circuits in the processor and/or instructions in the form of software. The steps of the methods disclosed in the embodiments of the present disclosure may be directly embodied as being performed and completed by a hardware decoding processor, or by a combination of hardware and software modules in the decoding processor.

Optionally, the software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above method in any of the embodiments in combination with its hardware.

For example, the processing unit and the communication unit described above may be implemented by a processor and a transceiver, respectively.

Figure 7:
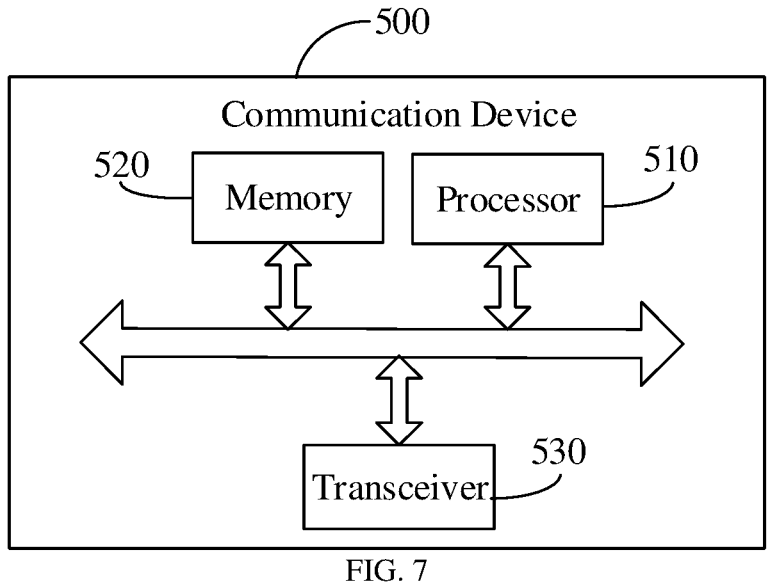
FIG. 7 is a schematic block diagram of a communication device according to an embodiment of the present disclosure.

FIG. 7 is a schematic structural diagram of a communication device 500 according to an embodiment of the present disclosure.

The terminal device 500 shown in FIG. 7 includes a processor 510.

The processor 510 can invoke and execute a computer program from a memory to implement the method in any of the embodiments of the present disclosure.

Referring to FIG. 7 again, the terminal device 500 may further include a memory 520.

The memory 520 can store instruction information, and can also store codes, instructions, etc., to be executed by the processor 510. The processor 510 can invoke and execute a computer program from the memory 520 to implement the method in any of the embodiments of the present disclosure. The memory 520 may be a separate device independent from the processor 510, or may be integrated in the processor 510.

Referring to FIG. 7 again, the terminal device 500 may further include a transceiver 530.

The processor 510 may control the transceiver 530 to communicate with other devices, and in particular, transmit information or data to other devices, or receive information or data transmitted by other devices. The transceiver 530 may include a transmitter and a receiver. The transceiver 530 may further include one or more antennas.

Exemplarily, the components in the terminal device 500 are connected through a bus system, which includes a power bus, a control bus and a state signal bus in addition to a data bus.

It can be appreciated that the communication device 500 may be the terminal device according to the embodiments of the present disclosure, and the communication device 500 may implement the corresponding process implemented by the terminal device in any of the methods according to the embodiments of the present disclosure. That is, the communication device 500 according to the embodiments of the present disclosure may correspond to the terminal device 300 according to the embodiments of the present disclosure, and may correspond to the corresponding entity performing the method 200 according to the embodiments of the present disclosure. For brevity, the details will be omitted here. Similarly, the communication device 500 may be the network device according to the embodiments of the present disclosure, and the communication device 500 may implement the corresponding process implemented by the network device in the methods according to the embodiments of the present disclosure. That is, the communication device 500 according to the embodiments of the present disclosure may correspond to the network device 400 according to the embodiments of the present disclosure, and may correspond to the corresponding entity performing the method 200 according to the embodiments of the present disclosure. For brevity, the details will be omitted here.

In addition, an embodiment of the present disclosure further provides a chip.

For example, the chip may be an integrated circuit chip, which has a signal processing capability, and can implement or execute the methods, steps, and logic block diagrams disclosed in the embodiments of the present disclosure. The chip may also be referred to as a system level chip, a system chip, a chip system, a system-on-chip, or the like. Optionally, the chip can be applied in various communication devices, such that a communication device installed with the chip can execute the methods, steps and logic block diagrams disclosed in the embodiments of the present disclosure.

Figure 8:
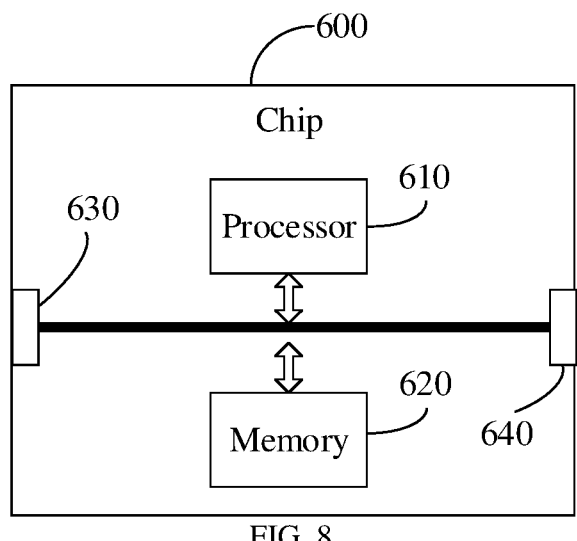
FIG. 8 is a schematic block diagram of a chip according to an embodiment of the present disclosure.

FIG. 8 is a schematic structural diagram of a chip 600 according to an embodiment of the present disclosure. As shown in FIG. 8, the chip 600 includes a processor 610.

The processor 610 can invoke and execute a computer program from a memory to implement the method in the embodiment of the present disclosure.

Referring to FIG. 8 again, the chip 600 may further include a memory 620.

The processor 610 can invoke and execute a computer program from a memory 620 to implement the method in the embodiment of the present disclosure. The memory 620 can store instruction information, and can also store codes, instructions, etc., to be executed by the processor 610. The memory 620 may be a separate device independent from the processor 610, or may be integrated in the processor 610.

Referring to FIG. 8 again, the chip 600 may further include an input interface 630.

The processor 610 can control the input interface 630 to communicate with other devices or chips, and in particular, obtain information or data transmitted by other devices or chips.

Referring to FIG. 8 again, the chip 600 may further include an output interface 640.

The processor 610 can control the output interface 640 to communicate with other devices or chips, and in particular, output information or data to other devices or chips.

It can be appreciated that the chip 600 can be applied in the network device in the embodiments of the present disclosure, and the chip can implement the corresponding process implemented by the network device in any of the methods according to the embodiments of the present disclosure, and can also implement the corresponding process implemented by the terminal device in any of the methods according to the embodiments of the present disclosure. For brevity, the details will be omitted here.

It can also be appreciated that, the components in the chip 600 are connected through a bus system, which includes a power bus, a control bus and a state signal bus in addition to a data bus.

The processor described above may include, but not limited to, a general purpose processor, a Digital Signal Processor (DSP), an Application Specific Integrated Circuit (ASIC), a Field Programmable Gate Array (FPGA) or another programmable logic device, a discrete gate or transistor logic device, a discrete hardware component, or the like.

The processor may be configured to implement or perform methods, steps, and logical block diagrams disclosed in the embodiments of the present disclosure. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, erasable programmable memory, or register. The storage medium can be located in the memory, and the processor can read information from the memory and perform the steps of the above methods in combination with its hardware.

The memory described above may include, but not limited to, a transitory memory and/or a non-transitory memory. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM).

It is to be noted that the memory described herein is intended to include these and any other suitable types of memories.

An embodiment of the present disclosure also provides a computer readable storage medium storing a computer program. The computer readable storage medium stores one or more programs. The one or more programs include instructions which, when executed by a portable electronic device including a plurality of applications, cause the portable electronic device to perform the method according to the embodiments shown in the method 200.

Optionally, the computer readable storage medium can be applied in the network device in the embodiment of the present disclosure, and the computer program can cause a computer to perform corresponding processes implemented by the network device in the method according to any of the embodiments of the present disclosure. Details thereof will be omitted here for simplicity.

Optionally, the computer readable storage medium can be applied in the mobile terminal/terminal device in the embodiment of the present disclosure, and the computer program can cause a computer to perform corresponding processes implemented by the mobile terminal/terminal device in the method according to any of the embodiments of the present disclosure. Details thereof will be omitted here for simplicity.

An embodiment of the present disclosure also provides a computer program product including a computer program.

Optionally, the computer program product can be applied in the network device in the embodiment of the present disclosure, and the computer program can cause a computer to perform corresponding processes implemented by the network device in the method according to any of the embodiments of the present disclosure. Details thereof will be omitted here for simplicity.

Optionally, the computer program product can be applied in the mobile terminal/terminal device in the embodiment of the present disclosure, and the computer program can cause a computer to perform corresponding processes implemented by the mobile terminal/terminal device in the method according to any of the embodiments of the present disclosure. Details thereof will be omitted here for simplicity.

An embodiment of the present disclosure also provides a computer program. The computer program, when executed by a computer, cause the computer to perform the method according to any of the embodiments shown in the method 200.

Optionally, the computer program product can be applied in the network device in the embodiment of the present disclosure. The computer program, when executed by a computer, can cause the computer to perform corresponding processes implemented by the network device in the method according to any of the embodiments of the present disclosure. Details thereof will be omitted here for simplicity.

In addition, an embodiment of the present disclosure also provides a communication system. The communication system may include the above terminal device and network device to form the communication system shown in FIG. 1. For brevity, the details will be omitted here. It should be noted that the terms "system" and the like as used herein may also be referred to as "network management architecture" or "network system" or the like.

It should also be understood that the terms used in the embodiments of the present disclosure and the claims as attached are only for the purpose of describing specific embodiments, and are not intended to limit the embodiments of the present disclosure.

For example, as used in the embodiments of the embodiments of the present disclosure and the claims as attached, the singular forms of "a," "said," "above," and "the" are intended to include the plurals form as well, unless the context clearly dictates otherwise.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the embodiments of the present disclosure.

When the function is implemented in the form of a software functional unit and sold or used as a standalone product, it can be stored in a computer-readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways.

For example, the divisions of the units, modules, or components in the device embodiments described above are only divisions based on logical functions, and there may be other divisions in actual implementations. For example, more than one unit, module or component may be combined or integrated into another system, or some units, modules, or components can be ignored or omitted.

In another example, the units/modules/components described above as separate/explicit components may or may not be physically separated, that is, they may be co-located or distributed across a number of network elements. Some or all of the units/modules/components may be selected according to actual needs to achieve the objects of the embodiments of the present disclosure.

Finally, it is to be noted that the mutual coupling or direct coupling or communicative connection as shown or discussed above may be indirect coupling or communicative connection between devices or units via some interfaces which may be electrical, mechanical, or in any other forms.

While the specific embodiments of the present disclosure have been described above, the scope of the embodiments of the present disclosure is not limited to these embodiments. Various variants and alternatives can be made by those skilled in the art without departing from the technical scope of the embodiments of the present disclosure. These variants and alternatives are to be encompassed by the scope of the embodiments of present disclosure as defined by the claims as attached.

What is claimed is:

1. A wireless communication method, performed by a terminal device, comprising:

determining, based on a first channel, whether to cancel transmission of a second channel, wherein the first channel is determined after multiplexing of at least one initial channel, each of the at least one initial channel has a priority higher than a priority of the second channel, the first channel is a Physical Uplink Control CHannel (PUCCH) or a Physical Uplink Shared CHannel (PUSCH), and the second channel is a PUCCH or a PUSCH;

wherein said determining, based on the first channel, whether to cancel the transmission of the second channel comprises:

cancelling the transmission of the second channel in a case that the first channel and the second channel overlap;

wherein the first channel and the second channel overlap, which comprises:

the at least one initial channel and the second channel overlapping in a time domain.

2. The method according to claim 1, wherein the first channel and the second channel fully or partially overlap.

3. The method according to claim 1, wherein first scheduling information for triggering the first channel is not earlier than scheduling information corresponding to any one of the at least one initial channel other than an initial channel corresponding to the first scheduling information.

4. The method according to claim 1, wherein the first channel is scheduled directly by first scheduling information for triggering the first channel.

5. The method according to claim 4, wherein the at least one initial channel is transmitted by multiplexing.

6. The method according to claim 1, further comprising:

maintaining cancellation of the transmission of the second channel in a case that a third channel and the second channel do not overlap.

7. The method according to claim 6, wherein scheduling information for triggering the third channel is not earlier than first scheduling information for triggering the first channel.

8. The method according to claim 1, wherein said determining, based on the first channel, whether to cancel the transmission of the second channel further comprises:

transmitting the second channel in a case that the first channel and the second channel do not overlap.

9. The method according to claim 1, wherein the at least one initial channel comprises a channel indicated by scheduling information and/or a channel determined by the scheduling information.

10. The method according to claim 9, wherein the channel determined by the scheduling information comprises: a channel determined after multiplexing or overriding of a channel determined directly based on the scheduling information.

11. The method according to claim 1, wherein a time-domain position of first scheduling information for triggering the first channel is a time-domain position of the first scheduling information or a time-domain position determined based on the first channel.

12. The method according to claim 11, wherein the time-domain position of the first scheduling information is the time-domain position determined based on the first channel, and the first channel is a semi-static or semi-persistent configured uplink channel.

13. A terminal device, comprising:
a transceiver;
a memory having a computer program stored thereon; and
a processor configured to invoke and execute the computer program stored in the memory to perform:
determining, based on a first channel, whether to cancel transmission of a second channel,
wherein the first channel is determined after multiplexing of at least one initial channel, each of the at least one initial channel has a priority higher than a priority of the second channel, the first channel is a Physical Uplink Control CHannel (PUCCH) or a Physical Uplink Shared CHannel (PUSCH), and the second channel is a PUCCH or a PUSCH;
said determining, based on the first channel, whether to cancel the transmission of the second channel comprises:
cancelling the transmission of the second channel in a case that the first channel and the second channel overlap;
wherein the first channel and the second channel overlap, which comprises:
the at least one initial channel and the second channel overlapping in a time domain.

14. The terminal device according to claim 13, wherein the first channel and the second channel fully or partially overlap.

15. The terminal device according to claim 13, wherein first scheduling information for triggering the first channel is not earlier than scheduling information corresponding to any one of the at least one initial channel other than an initial channel corresponding to the first scheduling information.

16. The terminal device according to claim 13, wherein the first channel is scheduled directly by first scheduling information for triggering the first channel.

17. The terminal device according to claim 16, wherein the at least one initial channel is transmitted by multiplexing.

18. The terminal device according to claim 13, wherein the at least one initial channel comprises a channel indicated by scheduling information and/or a channel determined by the scheduling information.

19. A network device, comprising:
a transceiver;
a memory having a computer program stored thereon; and
a processor configured to invoke and execute the computer program stored in the memory to perform:
determining, based on a first channel, whether to cancel transmission of a second channel,
wherein the first channel is determined after multiplexing of at least one initial channel, each of the at least one initial channel has a priority higher than a priority of the second channel, the first channel is a Physical Uplink Control CHannel (PUCCH) or a Physical Uplink Shared CHannel (PUSCH), and the second channel is a PUCCH or a PUSCH;
said determining, based on the first channel, whether to cancel the transmission of the second channel comprises:
cancelling the transmission of the second channel in a case that the first channel and the second channel overlap;
wherein the first channel and the second channel overlap, which comprises:
the at least one initial channel and the second channel overlapping in a time domain.

20. The network device according to claim 19, wherein the first channel and the second channel fully or partially overlap.

\* \* \* \* \*